O. H. TAYLOR.
Coffee Roaster.
No. 83,889.
Patented Nov. 10, 1868.
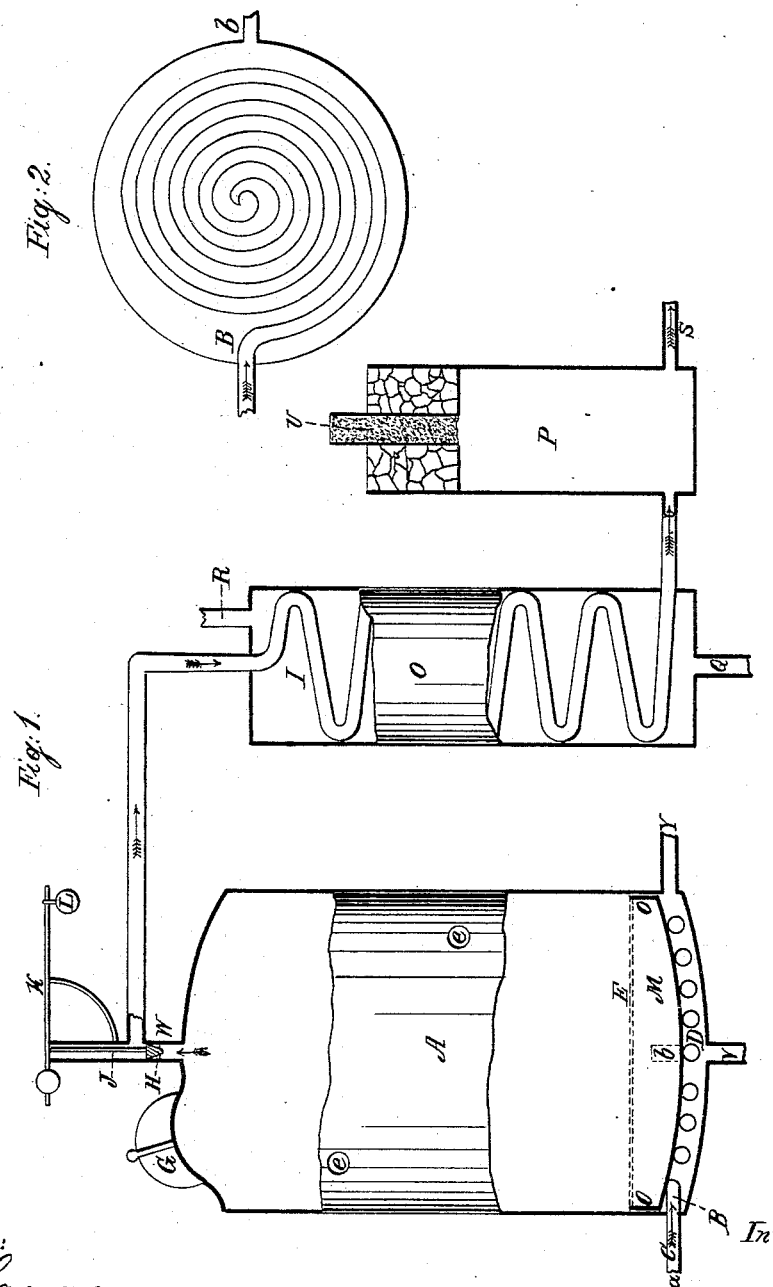

United States Patent Office.

O. H. TAYLOR, OF BROOKLYN, NEW YORK, ASSIGNOR TO HIMSELF, JOHN A. PARKS, AND DARIUS ALLEN, OF SAME PLACE.

*Letters Patent No. 83,889, dated November 10, 1868.*

IMPROVEMENT IN APPARATUS AND PROCESS FOR ROASTING COFFEE.

The Schedule referred to in these Letters Patent and making part of the same.

*To all whom it may concern:*

Be it known that I, O. H. TAYLOR, of the city of Brooklyn, in the county of Kings, and State of New York, have invented a new and improved Apparatus for Roasting Coffee; and I do hereby declare that the following is a full and exact description thereof, references being had to the accompanying drawings, and to the letters of reference marked thereon, making a part of this specification.

The nature of my invention consists in constructing an apparatus in such a manner that, by means of hot air, coffee may be roasted evenly throughout the mass or bulk, so that each kernel of coffee is thoroughly roasted to its centre. At the same time nearly all the aroma of the coffee is retained in the berry, so that but a small per cent. loss is sustained by roasting or browning coffee by means of my improved apparatus.

It is a fact well known, that various kinds of apparatus, such as revolving cylinders and pans, have been employed for this purpose, but have failed to produce the desired results, for the reason that a large per cent. loss is experienced, and it has been found impossible to roast the coffee evenly by any method or apparatus heretofore employed for that purpose; besides, the escape of the aroma leaves the coffee in a more or less damaged condition, by its being excessively roasted upon the outer surface of the berry, while the inner portion is undone or not sufficiently roasted.

By my invention, I am able to overcome and obviate all the difficulties heretofore encountered in roasting the article, in such a manner as to retain or preserve nearly all the virtues natural to the berry.

It has, for a long time, been the great desideratum of inventors, dealers, and consumers of coffee, to devise some means by which it could be roasted evenly throughout the berry, and at the same time prevent the loss of aroma.

By an experienced and thorough test of my apparatus, it is found that but a slight per cent. of loss is realized, and the article is roasted in any desired quantity (according to the capacity of the apparatus) in the most rapid and perfect manner.

My invention more particularly consists in the employment of a coiled hot-air pipe, into which hot air is introduced for the purpose of roasting the coffee.

It further consists in the employment of a condenser, being connected to the roasting-chamber so as to save the condensed liquid arising from the coffee during the time it is subjected to the action of heat. The said liquid is sprinkled upon the coffee, which readily absorbs it after it is roasted, either before or after it is removed from the apparatus.

To enable others skilled in the art to make and use my invention, I will proceed to describe its construction and operation.

Figure I is a side elevation of my improved apparatus for roasting coffee, with a portion of the side removed, leaving a section so as to show the internal arrangement of the apparatus.

Figure II is a plan view of the coil steam-pipe.

Letters of like name and kind indicate like parts in each of the figures.

A represents the coffee-chamber, that is made of sheet-metal, in a tubular, or cylindrical, or other suitable form, and of any desired capacity, air-tight, so as to resist a pressure. The ends are made convex or flat, as may be deemed best.

B is a hot-air pipe, coiled as shown in Fig. II, located in a steam-chamber, D, into which air is admitted at $a$, in the direction of the arrow $c$, passing through the pipe, escapes into the space M, between the steam-chamber and screen E, through perforations in the end of the said pipe at $b$, shown in dotted lines E.

The dotted lines E represent a perforated iron plate or screen, upon which the body or bulk of coffee lies while being subjected to the action of heat.

To construct the steam-chamber, I usually turn up the edge of the inside plate of the steam-chamber, as seen at $o\ o$, upon which rests the perforated iron plate or screen E.

$y$ is a steam-pipe, that connects the steam-chamber with a boiler.

$e\ e$ are openings in the shell of the coffee-chambers, covered with mica, glass, or other transparent substance, for the convenience of the attendant in observing the process of roasting, and to ascertain when the coffee is sufficiently roasted to be removed, without the necessity of removing the door for that purpose.

The door is not shown in the drawings, a particular description of which is deemed unnecessary, as I do not claim it as my invention.

G represents a man-hole and plate, constructed in the common or ordinary way, as in steam-boilers, located in the upper portion or top of the shell of the coffee-chamber. The object of the man-hole is to admit the charge of coffee into the chamber.

H is a safety-valve, of the ordinary kind, located in the discharge-pipe W, which connects with the condensing-pipe I. The said safety-valve, being provided with a valve-stem, J, connects, by a pivot-joint at the upper end of the discharge-pipe, with a scale-beam or lever, K, upon the outer end of which is a movable ball or weight, L.

The said discharge-pipe W passes from the coffee-chamber, and connects the condensing-pipe, which also connects with the condenser O, through which it passes in a spiral form, in a longitudinal direction, and connects with the receiver P.

In the lower portion of the condenser O is a cold-water-induction pipe, Q, that completely fills the condenser with water, which is continually forced in, and passes out of eduction-pipe R, which is located upon the top or upper portion of the condenser.

S is an eduction-pipe, located in or near the bottom of the receiver, and provided with suitable faucet, for the purpose of drawing off the condensed moisture or liquid arising from the coffee during the process of roasting.

T represents an ice-chamber, formed by an annular space in the upper portion of the receiver, the object of which is to more perfectly condense the vapors arising from the liquid in the receiver.

U is a tube, designed to be about one-fourth the size of the receiver, that extends upward a little from the top of the annular ice-chamber. The lower openings of the said pipe connect with the inner portion of the receiver. This tube U is filled with sponge, or other porous substance, through which the air permeates and escapes.

V is a waste-pipe, located in the bottom of the steam-chamber, provided with a suitable faucet to let off the water made by condensed steam.

The operation of my improved apparatus is simple, cheap, and satisfactory, and consists in placing the coffee within the coffee-chamber A, when a column of hot air is forced through the pipe B, which, if necessary, passes through a furnace or other proper place, is conducted within the coffee-chamber, through the medium of the said pipe B, where it is diffused throughout the bulk of coffee at the same time steam is admitted into the steam-chamber through the steam-pipe from a suitable boiler, located near and convenient to the apparatus.

The heat from the upper or inside-surface plate of the steam-chamber, together with the heat from the hot-air pipe, passes up through the perforated plate or screen, E, into the mass of coffee, through which it permeates, subjecting the whole bulk of the article to an equal action of heat, in such a manner that it is not liable to burn, or be in any way injured by the application of too much heat. At the same time the coffee is thoroughly roasted to the centre of each kernel.

During the process of roasting, the gases and moisture arising from the roasting mass are allowed to pass up, through the valve H and discharge-pipe W, into the condensing-pipe I, and are discharged into the receiver P.

The vapor or gas arising in the receiver, from the liquid therein, is again condensed by the sponge or other porous substance located in the tube U, while the air passes off into the common atmosphere.

After a batch of coffee has been roasted, the liquid contained in the receiver is drawn off, and either before or after the coffee has been removed from the coffee-chamber, the said liquid may be sprinkled over and through the mass, by which it is readily absorbed, thereby retaining the aroma as well as the weight lost during the process of roasting the coffee.

It will be observed that in case the steam does not produce a sufficient amount of heat, the coffee-chamber may be enclosed in brick-work, the steam superheated, or it may be effected by a suitable jacket around the steam-chamber, or it may be done in any other well-known manner.

It will also be observed that the coffee-chamber is designed to be made sufficiently strong to resist a pressure of several pounds to the square inch, so that the temperature will be the same throughout the chamber.

This pressure is obtained by means of an air-pump being applied to the outer end of the pipe B, and worked so as to keep up an even pressure during the process of roasting. By this pressure, the heat is forced evenly throughout each kernel of coffee. In this manner the coffee is roasted under a pressure of hot air evenly, and to any desired extent.

When the desired pressure in the coffee-chamber is obtained, the safety-valve rises, and allows the moisture and gases arising from the coffee to pass to the receiver, in the way and manner before described.

It will again be observed that a revolving cylinder may be used within the hot-air chamber, for the purpose of roasting, if desired.

Having thus described my invention,

What I claim as new, and desire to secure by Letters Patent of the United States, is—

1. The hot-air pipe B, located in the steam-chamber D, in connection with the coffee-chamber A, substantially as shown and described, and for the purpose set forth.

2. The coffee-chamber A, provided with a discharge or escape-pipe, W, in which is a safety-valve, H, the condensing-pipe I, and condenser O, in connection with the receiver P, for the purpose herein set forth, and substantially as described.

3. Roasting coffee, in the manner substantially as herein described, and for the purposes set forth.

O. H. TAYLOR.

Witnesses:
J. C. LAWRENCE,
F. SKILLMAN.